W. BILLING.
KEY SEATING MACHINE.
APPLICATION FILED APR. 10, 1909.

958,081.

Patented May 17, 1910.
2 SHEETS—SHEET 1.

WITNESSES
Jas. M. Tapley
G. Thomson

INVENTOR
Wm Billing

By Fred S. Greenough Atty

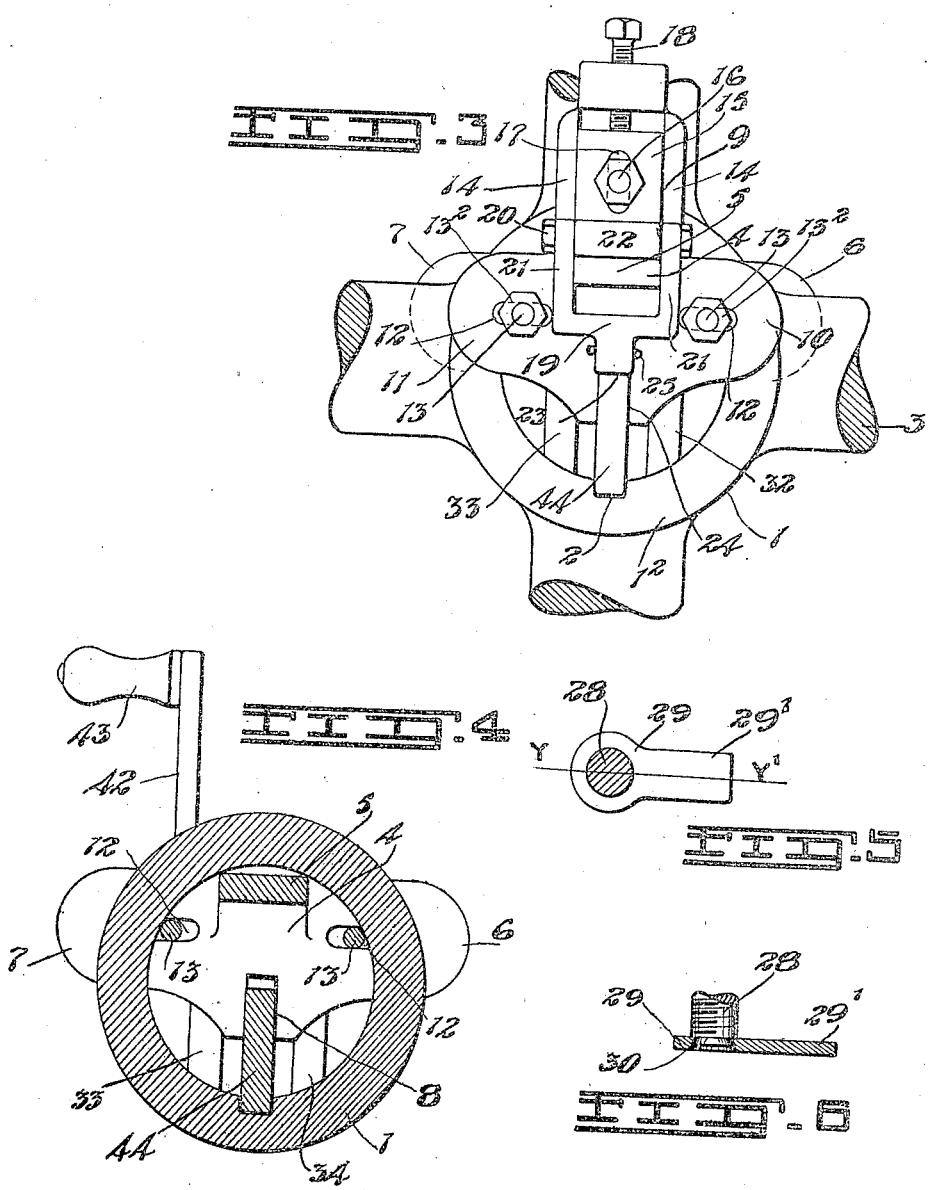

UNITED STATES PATENT OFFICE.

WILLIAM BILLING, OF ST. BONIFACE, MANITOBA, CANADA.

KEY-SEATING MACHINE.

958,081. Specification of Letters Patent. Patented May 17, 1910.

Application filed April 16, 1909. Serial No. 490,365.

*To all whom it may concern:*

Be it known that I, WILLIAM BILLING, of the city of St. Boniface, in the Province of Manitoba, Canada, have invented certain new and useful Improvements in Key-Seating Machines, of which the following is the specification.

My invention relates to key seating machines, particularly to the class which are available for forming key seats in the hubs of wheels.

The object of the invention is to provide an easily operated accurate and efficient machine of this class which can be readily secured in operative position and quickly adjusted to any size of hub, and which can be used to cut either a straight or tapered key seat, as desired by the operator.

The invention consists in certain features of novelty which are hereinafter particularly pointed out in the claims being first described with reference to the accompanying drawings in which,—

Figure 1:
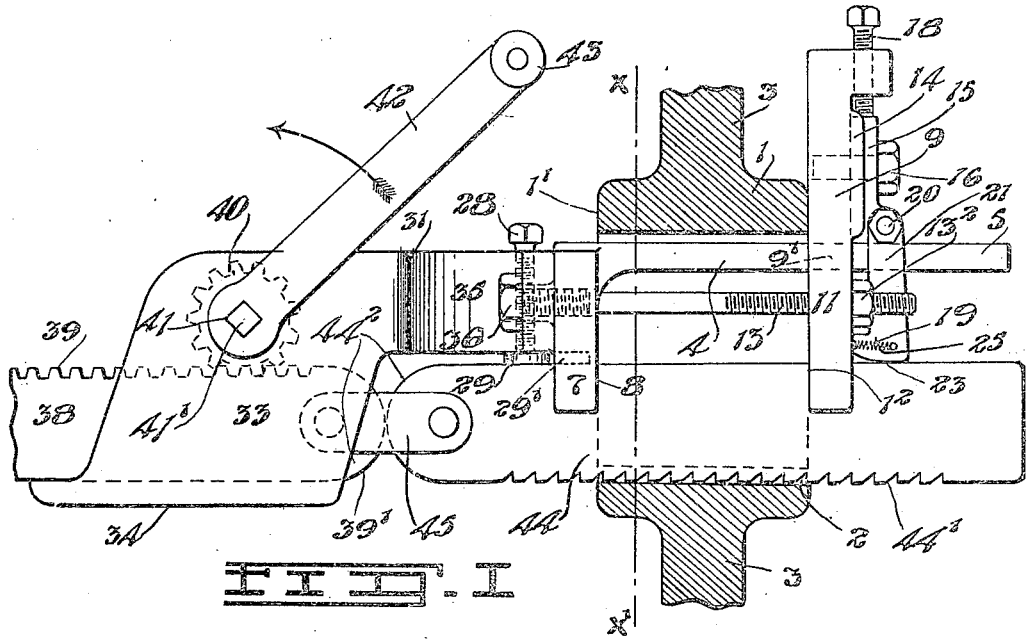
Figure 2:
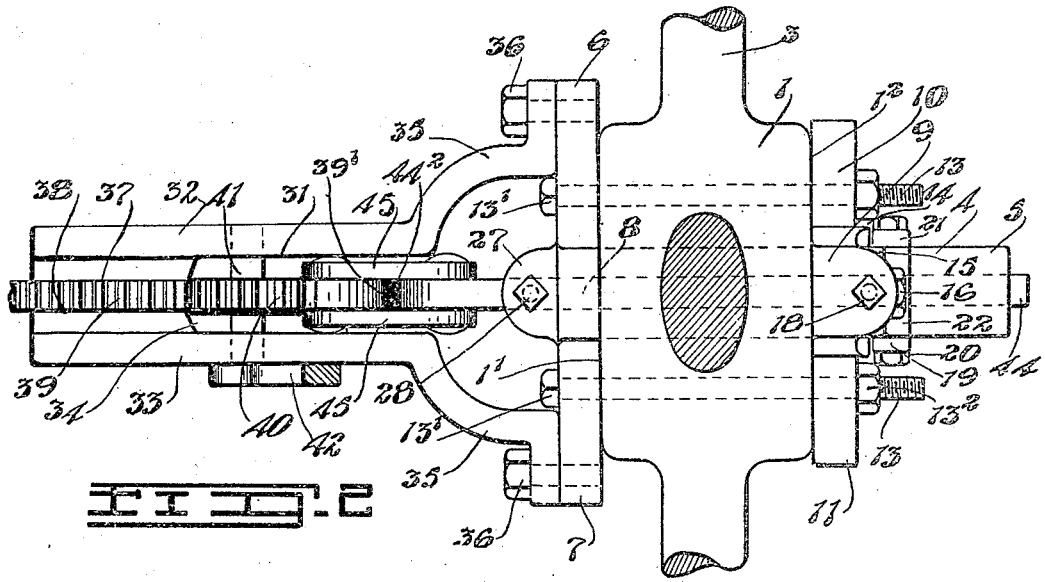

Figure 1 is a side elevation of my machine showing it in operative position, the hub to which the machine is secured being shown in vertical section. Fig. 2 is a plan view of the machine as in Fig. 1, the hub being shown also in plan. Fig. 3 is an end view of the machine, as in Fig. 1. Fig. 4 is a vertical sectional view through the hub in the plane denoted by the line X X', Fig. 1. Fig. 5 is a detailed plan view of the friction plate employed in the machine. Fig. 6 is a vertical sectional view through the friction plate in the plane denoted by the line Y Y', Fig. 5.

In the drawings like characters of reference indicate corresponding parts in each figure.

1 represents the hub of a wheel such as a pulley or fly wheel in which it is desired to form a key seat.

3 represents the spokes of a wheel extending from the hub, and 2 represents a key way therein.

4 is the main frame of the machine which consists in a horizontally disposed guide bar or shank 5, from which there extends laterally at one end two similar opposing wings 6 and 7 which are adapted to bear against the face 1' of the hub. At the juncture of the wings immediately beneath the shank I have provided a slot 8 the side walls of which, if extended, would intersect the shank at right angles. The purpose of this slot will hereinafter become apparent.

9 is an adjustable head slidably mounted on the shank there being a transverse opening formed in the head at 9', to admit the shank, as will readily be understood. The head has formed thereon two similar laterally projecting wings 10 and 11, which when the head is in position on the shank are arranged so that they appear horizontally opposite the wings 6 and 7 hereinbefore referred to. The wings 10 and 11 are designed to bear against the face $1^2$ of the hub. The wings 6, 7, and 10 and 11 are provided with pairs of transverse elongated openings 12 which receive the threaded bolts 13 having their heads 13' resting on the faces of the wings 6 and 7, and are provided with adjusting nuts $13^2$ which operate against the faces of the wings 10 and 11. By means of these nuts the position of the head on the shank is determined. The head is provided with a set of vertically directed ribs 14 which form a guideway for a vertically slidable plate 15 held to the head by a bolt 16 which passes through an elongated opening 17 provided in the plate and screws into the head.

18 is an adjusting screw carried by the head and having its lower end playing on the upper edge of the plate 15.

19 is a feed bar pivotally supported from the lower side of the plate 15 by means of a bolt 20 which passes through the arms 21 of the feed bar, and into the plate which is enlarged at 22 and bored to receive it. The arms it will be noticed span the shank and allow the feed bar and plate to be adjusted. The lower edge of the feed bar is rounded at 23 for a purpose which will hereinafter be more apparent. The head is supplied with a vertical slot 24 which is in the same plane as the slot 8, and of the same dimensions. The edge 23 of the feed bar is positioned so that it appears in the same vertical plane as the slot 24.

25 are spiral springs secured to the feed bar and to the head their purpose being to hold the feed bar normally against the head.

The shank is provided with an extending lug 27 at the end adjoining the wings 6 and 7, and the lug is provided with a vertically extending threaded opening in which operates an adjusting screw 28, the screw appearing in the same plane as the slot 8 hereinbefore described. To the lower end of the screw is attached the frictional plate 29 which has a projecting portion 29' entering the slot 8 thereby preventing the plate from turning with the screw which it will be noticed is swiveled at 30 to the plate.

31 is a tail piece formed from side pieces 32 and 33 and a cross uniting piece 34. The side pieces have suitable arched feet 35 formed thereon which are connected by bolts 36 firmly to the wings 6 and 7. Between the plates there is formed a slideway 37 which is in alinement with the slots 8 and 24, respectively, and located in the slideway is a rack 38 with the teeth 39 thereof extending upwardly and meshing with the teeth of a pinion 40 carried on a cross shaft 41 mounted in suitable bearings formed in the side pieces 32 and 33.

42 is a crank detachably secured to the squared end 41' of the shaft whereby the shaft can be turned when desired. The crank is provided with a suitable gripping handle 43.

44 is a toothed cutting bar, rectangular in cross section, and designed to be received slidably within the slots 8 and 24, the teeth 44' of the bar being directed downwardly. The adjoining ends 39' and 44² of the rack and cutting bar respectively are rounded and they are united by opposing links 45 riveted together through the ends of the rack and cutting bar.

In order to better understand my invention I will now describe its operation and the manner in which it is attached to a wheel. The nuts 13² are removed and the head is slid from the shank. The shank is then inserted within the hub, the bolts 13 taking the position as required by the hub, it being noticed that they are free at this time to slide within the elongated openings 12. The head is then replaced on the shank and tightened against the hub by screwing up the adjusting nuts 13², it being understood that the hub intervenes between the wings 6 and 7, and 10 and 11. The adjusting screws 18 and 29 are previously turned so as to allow the cutting bar 44 to pass within the hub. The crank 42 is then reciprocated backwardly and forwardly and the adjoining screws 18 and 28 are gradually tightened by any convenient form of wrench, thereby feeding the cutting bar. This operation is continued until the key seat has been sunk in the hub to the distance required, and it will be noticed that it is possible to taper the key seat by adjusting the screws so that one end of the cutting bar is held lower than the other.

Particular attention is called to the feed bar 19 which it will be noticed rides continuously on the upper edge of the cutting bar, and on account of the peculiar construction of the edge 23 passes away from the head each time the crank is moved in the direction indicated by the arrow (Fig. 1). This construction allows the cutting bar to free itself from the cut when it is passed from the left to the right, and to take the cut when passed in the opposite direction.

In using this machine one is assured that the key seat cut will always have its walls accurate and regular, the walls being parallel to each other and with a plane located midway therebetween which passes through the center of the hub. The reason for this is quite obvious if reference be made to Fig. 4.

It is a well known fact that a line passing vertically from the central point of the chord of a circle passes through the center of the circle. I have applied this truth in my machine. The plane passing through the centers of the bolts 13 represents the chord of the circle, and the slots 8 and 24 are so designed that the plane passing centrally through them intersects this chord at right angles and centrally of its length. Therefore the cutting bar is located in a plane which passes through the center of the hub and consequently cuts at all times accurately and efficiently.

What I claim as my invention is:

1. In a key seating machine, in combination, a main frame consisting in a shank provided with laterally extending wings, said frame having a slot formed therein with the walls thereof passing at right angles to the plane of the shank; a head slidable on the shank and provided with laterally extending wings, there being a slot in the head opposing the slot aforesaid, and with its walls passing at right angles to the plane of the shank; means securing the head adjustably to the frame; a cutting bar longitudinally slidable within the slots; means carried by the head and by the frame whereby the position of the cutting bar in the slots can be adjusted; a tail piece secured to the wings of the frame; and means carried by the tail piece and secured to the shank whereby the shank can be reciprocated longitudinally, as and for the purpose specified.

2. In a key seating machine, in combination, a main frame consisting in a shank provided with laterally extending wings, said frame having a slot formed therein with the walls thereof passing at right angles to the plane of the shank; a head slidable on the shank and provided with laterally extending wings, there being a slot in the head opposing the slot aforesaid, and with its walls passing at right angles to the plane of the shank; means securing the head adjustably to the frame; a cutting bar longitudinally slidable within the slots; means carried by the head and by the frame whereby the position of the cutting bar in the slots can be adjusted; a tail piece secured to the wings of the frame, said tail piece being provided with a slideway alined with the slots aforesaid; a rack received within the slideway and linked to the cutting bar; a pinion in mesh with the rack; and a crank for rotating the pinion, as and for the purpose specified.

3. In a key seating machine, in combination, a main frame consisting in an extending shank of rectangular cross section having laterally extending wings located at one of its ends, there being a slot formed at the junction of the wings, said slot having the walls thereof passing at right angles to the plane of the shank; a head slidable on the shank having laterally extending wings opposing those aforesaid and provided at the junction of the wings with a slot directly opposing the former slot, and with its walls passing at right angles to the plane of the shank; adjusting bolts connecting the wings carried by the head and the frame; a cutting bar longitudinally slidable within the slots; adjustable means carried by the head and bearing on the upper edge of the cutting bar; adjusting means carried by the frame and bearing on the cutting bar; and means for reciprocating the cutting bar longitudinally, as and for the purpose specified.

4. In a key seating machine adapted for forming a key seat in the hub of a wheel, in combination, a main frame having an extending shank adapted to pass through the opening in the hub and provided with laterally extending wings designed to bear against one face of the hub; a head slidable on the shank and provided with laterally extending wings adapted to bear against the other face of the hub, and opposing the former wings; means passing longitudinally through the hub and secured to the frame and the head whereby the frame and head can be securely fastened to the hub; a cutting bar adapted to pass within the hub and be received within slots formed in the head and the frame, said slots being in a plane passing through the center of the hub and at right angles to the shank; means for reciprocating the cutting bar; adjustable means carried by the frame and bearing on the cutting bar; and adjustable means carried by the head and bearing on the upper edge of the cutting bar, the former and the latter adjusting means being located at the outer faces of the wings, as and for the purpose specified.

5. A key seating machine comprising a frame adapted to pass through the opening in the hub, said frame having wings thereon, an adjustable head having wings thereon, means engaging with said wings for clamping the hub between said parts, a reciprocating cutting bar carried by the frame, and independent means engaging with each end of the cutting bar for applying pressure thereto, whereby one end of the key way may be cut deeper than the other.

Signed at Winnipeg, in the Province of Manitoba, this 1st day of March, 1909.

WILLIAM BILLING.

Witnesses:
G. S. ROXBURGH,
M. A. SOMERVILLE.